United States Patent [19]

Drinkwater

[11] Patent Number: 4,818,891
[45] Date of Patent: Apr. 4, 1989

[54] RIDE-THROUGH ENERGY BOOST CIRCUIT

[75] Inventor: Don L. Drinkwater, Shirley, Mass.

[73] Assignee: Digital Equipment Corporation, Maynard, Mass.

[21] Appl. No.: 191,119

[22] Filed: May 6, 1988

[51] Int. Cl.$^4$ ............................................. H02J 7/00
[52] U.S. Cl. ....................................... 307/64; 307/66; 365/229; 361/92; 363/37
[58] Field of Search .................................... 307/64, 66; 365/226–229; 323/224; 361/88, 89, 90, 91, 92, 93; 363/37

[56] References Cited

U.S. PATENT DOCUMENTS

| | | | |
|---|---|---|---|
| 4,313,060 | 1/1982 | Fickenscher et al. | 363/37 X |
| 4,709,318 | 11/1987 | Gephart et al. | 307/66 X |
| 4,719,550 | 1/1988 | Powell et al. | 307/66 X |

Primary Examiner—William M. Shoop, Jr.
Assistant Examiner—Paul Ip
Attorney, Agent, or Firm—Kenyon & Kenyon

[57] ABSTRACT

A method and an apparatus which delay initiation of a shut down procedure in a computer to allow the riding through of variations in a power supply. An interrupter receives and interrupts an asserted shut down signal and outputs an interrupt signal when the shut down signal has been asserted. A gate trigger is coupled to the interrupter and triggers an energy booster to raise the power supplied to the computer when the gate trigger receives the interrupt signal from the interrupter. The amount of energy remaining in the energy booster is monitored by a monitor and a depletion signal is outputted when the amount of energy remaining in the energy booster is below a reference value. An output stage has inputs coupled to the interrupter and the monitor, and receives at these inputs the interrupt signal and the depletion signal and outputs a re-asserted shut down signal to the computer when both the interrupt signal and the depletion signal are present at the inputs of the output stage.

16 Claims, 3 Drawing Sheets

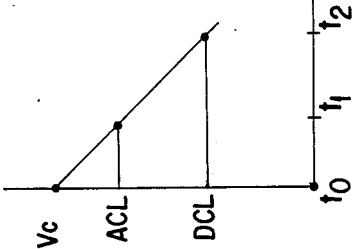
FIG. I(a) PRIOR ART
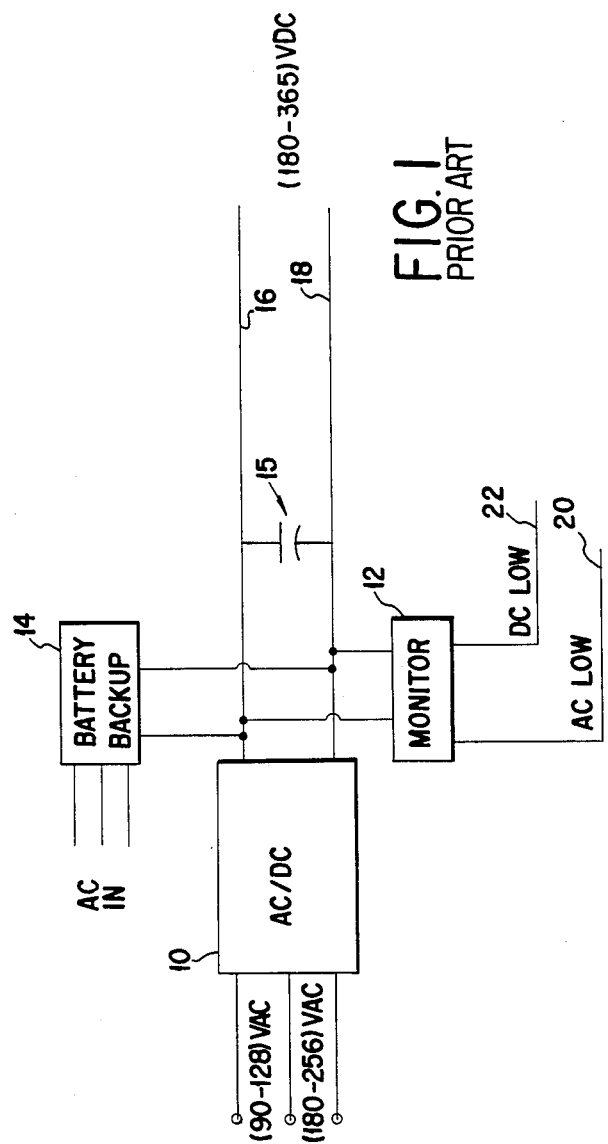
FIG. I PRIOR ART

RIDE-THROUGH ENERGY BOOST CIRCUIT

FIELD OF THE INVENTION

The invention is related to the field of supplying power to a computer. More specifically, the invention is related to a device and a method which allows a computer to ride through variations in the power supply voltage without immediately causing initiation of a shut down procedure of the computer.

BACKGROUND OF THE INVENTION

Computer users normally depend upon a local electric utility company to provide energy that is within a specified voltage range. When the voltage deviates from this range, even briefly, many computers follow an orderly shut down procedure. Shutting down results in lost work time for the operator.

Devices are known which monitor the power supplied to the computer and initiate a shut down procedure when the supply voltage reaches a certain value, the AC low voltage. The monitor outputs an AC low signal to the computer when the AC low voltage is reached. Once this AC low signal is asserted by the monitor, the shut down procedure is begun, and the known devices cause the computer to stop processing and to perform housekeeping functions which prevent a significant loss of information.

The vast majority of voltage supply problems are of short duration, on the order of 100-500 msec. By providing a device which allows the computer to ride through a short duration voltage supply problem, the initiation of the shut down procedure would be avoided in most instances However, when the problem persists beyond the short duration, the shut down procedure should be initiated.

SUMMARY OF THE INVENTION

It is therefore an object of the invention to provide a method and apparatus which allow a computer to ride through short duration variations in a power supply voltage.

This and other objects are achieved according to the invention by a device which delays initiation of a shut down procedure in a computer, the device comprising an interrupter for receiving and interrupting an asserted shut down signal. The interrupter outputs an interrupt signal when the shut down signal has been asserted A gate trigger is coupled to the interrupter and triggers an energy booster to raise the power supplied to the computer when the gate trigger receives the interrupt signal from the interrupter. A means for monitoring the amount of energy remaining in the energy booster is coupled to the energy booster and outputs a depletion signal when the amount of energy in the energy booster is below a reference value. An output stage is coupled to the interrupter and the means for monitoring and receives as inputs the interrupt signal and the depletion signal. The output stage outputs a re-asserted shut down signal when both the interrupt signal and the depletion signal are present at the inputs of the output stage.

The above and other objects are also achieved according to the invention by a method for causing a computer to ride through a variation in power supplied to the computer, where the variation is indicated by an asserted shut down signal. The method comprises the steps of: interrupting the asserted shut down signal; controlling an energy booster upon assertion of the shut down signal to boost the power supplied to the computer; and outputting to the computer a re-asserted shut down signal to allow initiation of a shut down of the computer when the energy of the energy booster is below a reference value and the shut down signal is asserted.

The device and method according to the present invention provide the advantage of avoiding the shutting down of a computer when the variation in the power supply voltage is of short duration, while still allowing an orderly shut down procedure to occur if the variation is of longer duration.

BRIEF DESCRIPTION OF THE DRAWINGS

FIG. 1 shows a block diagram of the power input stages of a computer according to the prior art.

FIG. 1a is a graph of the voltage across an input capacitor plotted against the time after the beginning of a variation in the power supply voltage.

DETAILED DESCRIPTION

FIG. 1 shows a prior art arrangement of power input stages for a computer. An AC/DC converter 10 converts the utility voltage to a DC bulk voltage. This DC bulk voltage is supplied to DC/DC converters, not shown, which power the computer over lines 16 and 18.

A monitor 12 monitors the DC bulk voltage and outputs two status signals to the computer shut down logic (not shown) of the computer An AC low signal is output over line 20 and a DC low signal is output over line 22. The AC low signal informs the computer shut down logic that there is just enough energy left to perform the housekeeping functions required to prevent a significant loss of information. The computer stops operating after the AC low signal is asserted. The DC low signal, which is always preceded by the AC low signal during a power down sequence, informs the computer that one or more DC/DC converters outputs are out of regulation. The computer is typically down within microseconds after the assertion of the DC low signal. The time between the assertion of the AC low signal and the DC low signal is known as the hold up time, shown graphically in FIG. 1a ($t_2-t_1$), and can be extended by hold-up time extenders. The time ($t_1-t_0$) is the ride through of a prior art arrangement operating at a nominally specified utility power source input. At the minimally specified utility power source input, this prior art arrangement provides no ride through.

The battery backup 14 of FIG. 1 charges the backup capacitor 15 to provide enough power for the computer to maintain a specified level of intelligence during a power failure. However, not every drop in voltage indicates a power failure, necessitating initiation of a shut down procedure. By "riding through" these occasional short duration voltage drops, the use of the computer will not be disturbed. One approach to avoiding the initiation of a shut down is the use of a motor generator with a flywheel to maintain the input voltage. This approach is expensive in terms of real estate and cost.

Figure 2A:
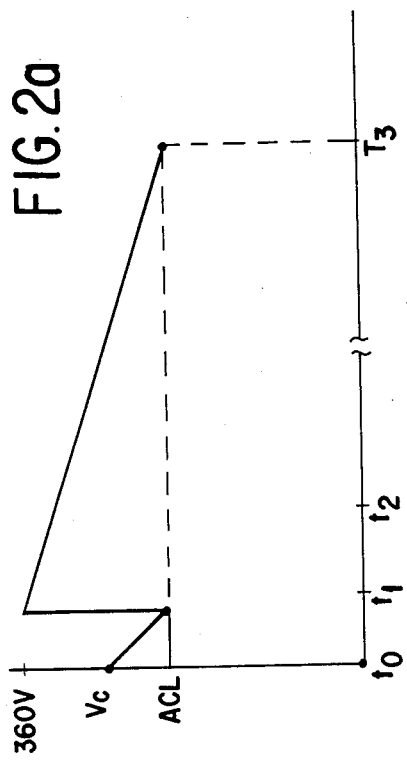
FIG. 2a is a graph of the voltage across an input capacitor plotted against the time after the beginning of a variation in the power supply voltage.
Figure 2:
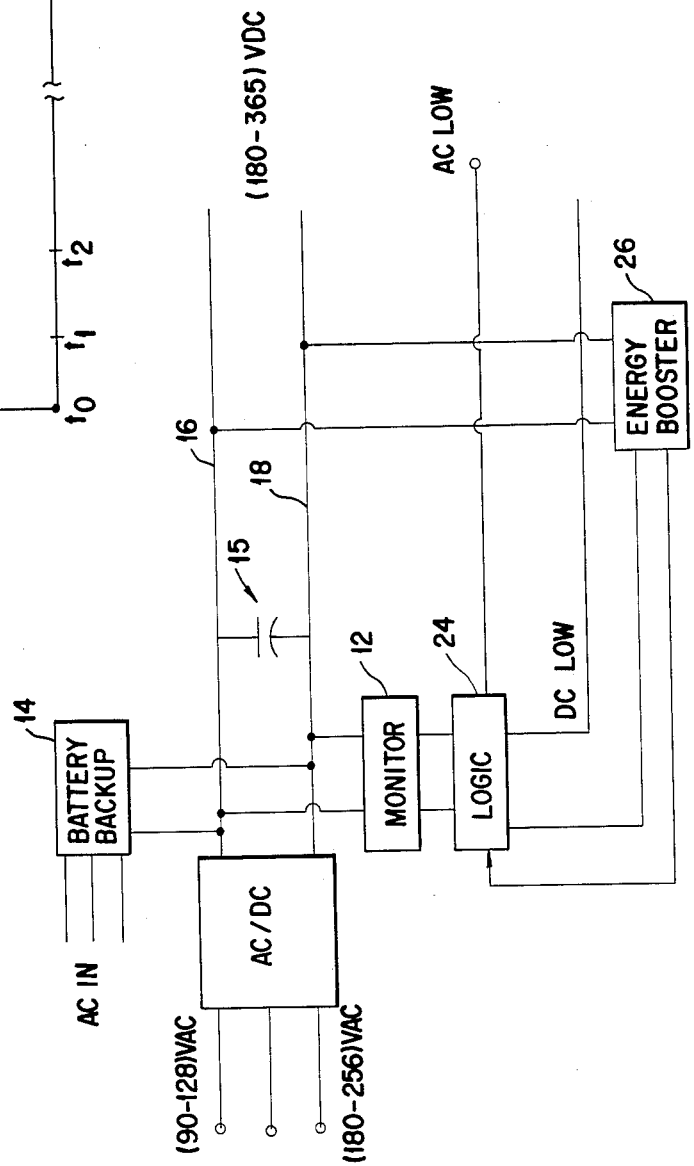
FIG. 2 shows a block diagram of the power input stages of a computer according to the present invention.

The present invention avoids shut down by interrupting an asserted AC low signal and boosting the voltage with the arrangement shown in FIG. 2. The monitor 12 of the prior art is connected to a ride through logic circuit 24. As will be explained in more detail below, the ride through logic circuit 24 interrupts an asserted AC low signal and triggers an energy booster 26. Energy boosters themselves are well known.

The ride through logic circuit 24 causes the voltage $V_c$ to be raised by the energy booster 26 when the AC low signal is asserted. This is illustrated in FIG. 2a. A long ride through time is thereby provided, the ride through time being defined as the time between loss of nominally specified utility power source input to the computer and the time at which the voltage $V_c$ has decreased to the AC low signal voltage ($t_3-t_0$). At the minimum specified power source input, the present invention provides a ride through time of ($t_3-t_1$).

Hopefully, during this ride through time, the voltage supply has returned to normal, obviating the need for initiation of a shut down. If at $t_3$ the voltage supply has not returned to normal and $V_c$ has decreased to the AC low voltage, then shut down is initiated by the shut down logic, which receives a re-asserted AC low signal from the ride through logic circuit 24 on line 28.

Figure 3:
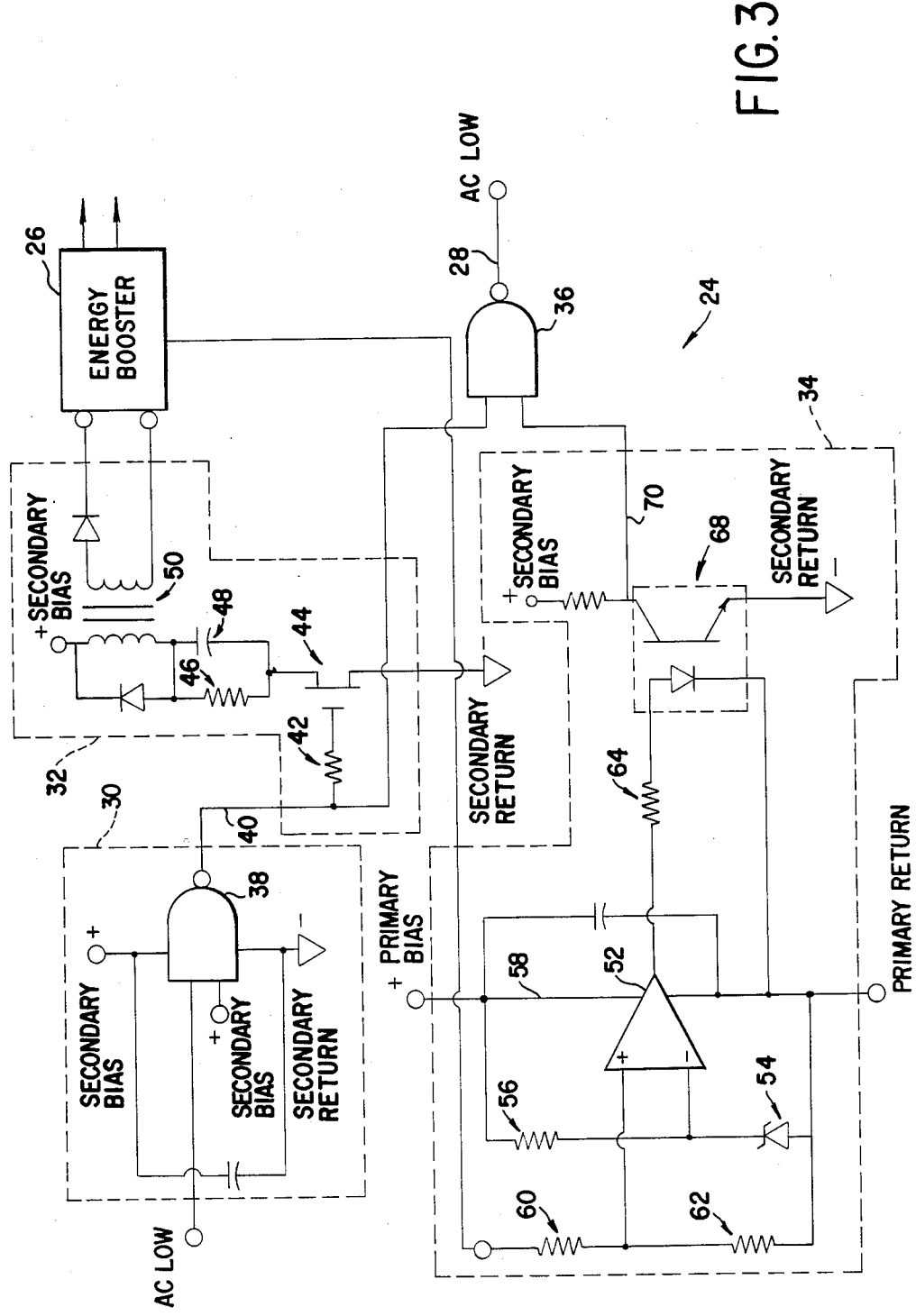
FIG. 3 is a schematic diagram of the ride through circuit shown in block form in FIG. 2 constructed according to an embodiment of the present invention.

An embodiment of the ride through logic circuit 24 according to the invention is shown in FIG. 3, connected to the energy booster 26. The major components of the logic circuit 24 are an interrupter 30, a gate trigger 32, a comparator 34 and an output stage 36.

The interrupter 30 receives as an input the AC low signal from the monitor 12. Although other logic can be used, the embodiment illustrated in FIG. 3 comprises a NAND gate 38, which has as its inputs the AC low signal from monitor 12 and a high signal from a secondary bias source. The primary bias source is a voltage source referenced to the utility power source input, whereas the secondary bias source is a voltage source that is isolated from the primary bias source in order to maintain a required safety integrity. The output of gate 38 will always be low until the AC low signal is asserted (becomes low). The gate 38 will then output a high signal on line 40 to both the gate trigger 32 and the output stage 36.

The gate trigger 32 receives the high signal on line 40 through resistor 42, which is connected to the gate of transistor 44. The drain of transistor 44 is connected to a resistor 46 and a capacitor 48 which are in parallel. The resistor 46 and capacitor 48 are each connected to a transformer 50, the output of which is connected to the energy booster 26. The transformer provides the required isolation between the primary and secondary bias sources to maintain safety integrity for the gate trigger 32 and thus can be considered an isolating transformer. When a high signal is on line 4 (the AC low signal is asserted), the transistor 44 turns on, causing the gate trigger 32 to trigger the energy booster 26 so that it can raise $V_c$ across capacitor 15.

The comparator 34 includes an operational amplifier (op amp) 52 which receives at its negative input a reference voltage established by a zener diode 54 and a shunt resistor 56. The op amp 52 is powered by the primary bias supply voltage on line 58. The value of the amount of energy remaining in the energy booster 26 is input to the comparator 34 at resistor 60, which together with resistor 62, forms a voltage divider. The op amp 52 receives at its positive input the value from the voltage divider, which is proportional to the value received from the energy booster 26. The op amp 52 outputs a low signal whenever the signal at its positive input is less than at its negative input. In other words, the op amp 52 will output a low signal when the energy remaining in the energy booster 26 falls below a reference value.

The output of op amp 52 is connected to a resistor 64, which is connected to the input of optical isolator 68. When the input voltage to the optical isolator is high, a low will be present at line 70, which is connected between the collector of optical isolator 68 and the output stage 36. When the input of optical isolator 68 is low, a high will be present on line 70. Again, the optical isolator 68 provides the required isolation to maintain safety integrity for the comparator 34. In summary, the output of op amp 52 goes low when the energy remaining in the energy booster 26 falls below a reference value. This causes the voltage at the input of optical isolator 68 to go low, which causes a high signal to be present on line 70.

The output stage 36 is a NAND gate 36 in the illustrated embodiment. The two inputs for the NAND gate 36 are from the output of NAND gate 38 and from the comparator 34 (on line 70). A low signal will be output from the NAND gate 36 only when both inputs are high. The low signal is received by a shut down circuit.

The operation of the ride through logic circuit 24 when an AC low signal is asserted is as follows. The interrupter 30 receives the asserted AC low signal and prevents it from immediately reaching the shut down circuit. Upon receipt of the asserted AC low signal, the output of gate 38 goes high, which causes gate trigger 32 to trigger the energy booster 26. The voltage across the capacitor 15 ($V_c$) is raised by the energy from the energy booster 26. The amount of energy remaining in the energy booster 26 is monitored by the comparator 34. While there is sufficient energy in the energy booster 26, the comparator 34 outputs a low signal to the output stage 36, which therefore does not send the asserted AC low signal. It is only when the energy in the energy booster 26 has been depleted below a reference value that the comparator 34 outputs a high signal to output stage 36. If both the AC low signal is asserted on line 40 and the energy from the energy booster 26 falls below the reference value, then the output stage 36 outputs an asserted AC low signal to the shut down circuit to cause an orderly shut down of the computer However, if the power supply voltage has been restored before the energy from the energy booster 26 has fallen below the reference value, then the comparator 34 does not output a high signal to the output stage 36 so that the output of gate 36 will remain high, and the shut down procedure will not be initiated by the computer. Thus, short duration drops in the power supply to the computer can be tolerated without immediate initiation of shut down procedures.

What is claimed is:

1. A device for riding through variations in a power supply and delaying initiation of a shut down procedure in a computer, the device comprising
   an energy booster for raising the power supplied to the computer;
   an interrupter for receiving and interrupting an asserted shut down signal and outputting an interrupt signal when said shut down signal has been asserted;
   a gate trigger coupled to said interrupter and said energy booster for triggering said energy booster to raise the power supplied to the computer when said gate trigger receives said interrupt signal from said interrupter;

means for monitoring an amount of energy remaining in said energy booster coupled to said energy booster, said means for monitoring outputting a depletion signal when the amount of energy in said energy booster is below a reference value; and an output stage having inputs coupled to said interrupter and said means for monitoring, said output stage receiving at said inputs said interrupt signal and said depletion signal and outputting a re-asserted shut down signal to said computer when both said interrupt signal and said depletion signal are present at the inputs of said output stage.

2. The device of claim 1, wherein said means for monitoring comprises a voltage divider having an input coupled to said energy booster, and a comparator coupled at one input to a reference voltage supply to receive a reference voltage and at another input to said voltage divider to receive a remaining energy voltage from said voltage divider.

3. The device of claim 2, wherein said means for monitoring further comprises an isolator coupled between the comparator and the output stage, said isolator issuing said depletion signal upon receiving a signal from said comparator indicating said remaining energy voltage is below said reference voltage.

4. The device of claim 3, wherein said isolator is an optical isolator.

5. The device of claim 4, wherein said interrupter includes a logic gate which receives as inputs said shut down signal and a constant signal, and outputs said interrupt signal when said shut down signal is asserted.

6. The device of claim 5, wherein said logic gate is a NAND gate.

7. The device of claim 3, wherein said gate trigger includes a transistor controlled by said interrupt signal, a resistor and a capacitor both connected at one end to said transistor, and an isolating transformer connected to both said resistor and said capacitor at the other ends of said resistor and said capacitor, said isolating transformer outputting a trigger signal to trigger said energy booster when said interrupt signal is received by said transistor.

8. The device of claim 1, wherein said interrupter includes a logic gate which receives as inputs said shut down signal and a constant signal, and outputs said interrupt signal when said shut down signal is asserted.

9. The device of claim 8, wherein said logic gate is a NAND gate.

10. The device of claim 1, wherein said gate trigger includes a transistor controlled by said interrupt signal, a resistor and a capacitor both coupled at one end to said transistor, and an isolating transformer coupled to both said resistor and said capacitor at the other ends of said resistor and said capacitor, said isolating transformer outputting a trigger signal to trigger said energy booster when said interrupt signal is received by said transistor.

11. A method for causing a computer to ride through a variation in power supplied to the computer, the variation being indicated by an asserted shut down signal, the method comprising the steps of:

(a) interrupting the asserted shut down signal;

(b) controlling an energy booster upon assertion of the shut down signal to boost the power supplied to the computer; and (c) outputting to the computer a re-asserted shut down signal to allow initiation of a shut down of the computer when an amount of energy in said energy booster is below a reference value and said shut down signal is re-asserted.

12. The method of claim 11, wherein step (c) further comprises the step of comparing in an operational amplifier the amount of energy in said energy booster with the reference value.

13. The method of claim 12, wherein said comparing step includes the step of converting the amount of energy in said energy booster and the reference value into voltages which are inputs to said operational amplifier 14. The method of claim 13, wherein said comparing step includes controlling an isolator in accordance with an output of said operational amplifier.

15. The method of claim 12, wherein step (c) includes controlling an output stage according to a signal from an output of the isolator and from said asserted shut down signal, said output stage outputting said re-asserted shut down signal when the energy of said energy booster is below the reference value and the shut down signal is asserted.

16. The method of claim 11, wherein step (b) includes the step of operating a gate trigger in response to assertion of the shut down signal such that said gate trigger triggers the energy booster to boost the power supplied to the computer.

* * * * *